June 28, 1949.　　G. B. STEINCROSS　　2,474,287
VOLTAGE REGULATOR
Filed Sept. 4, 1945
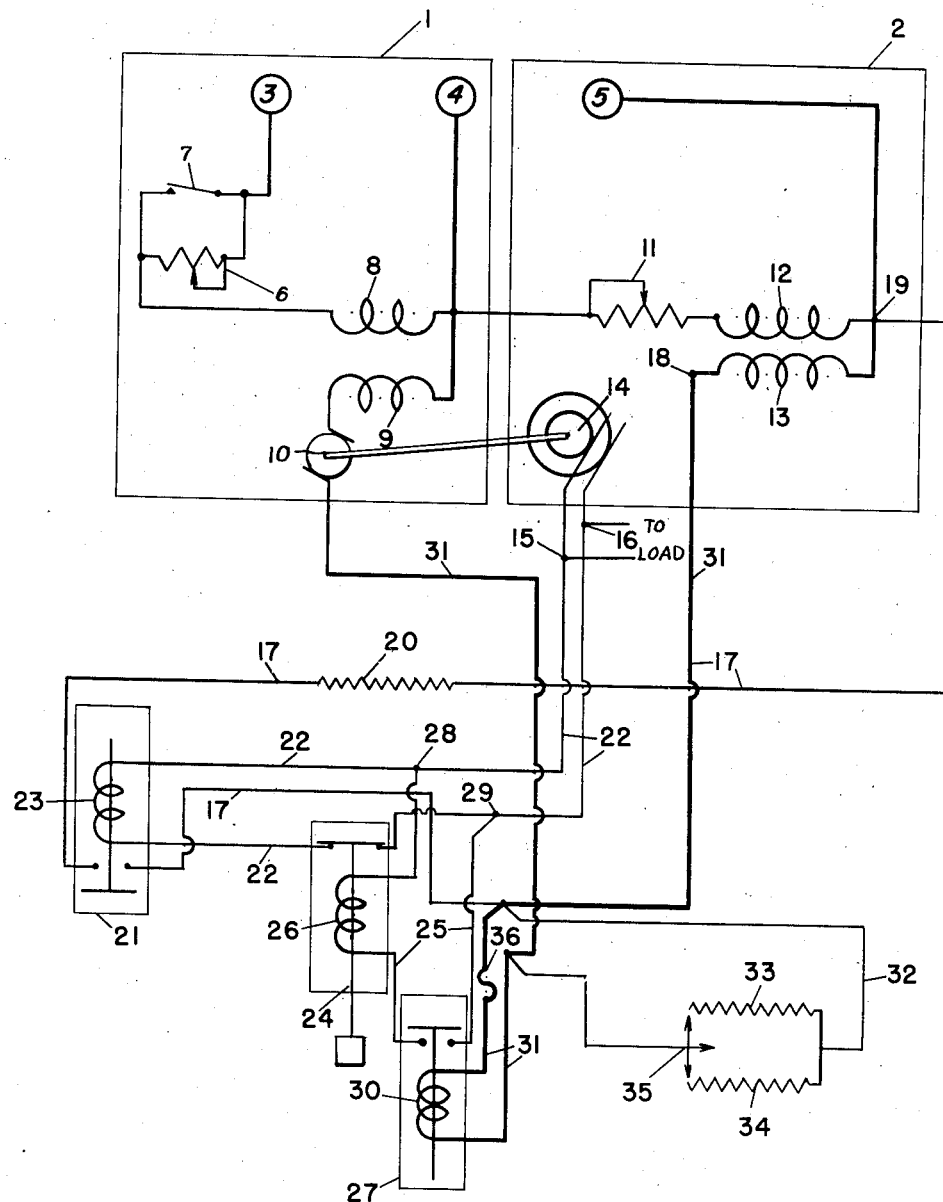
INVENTOR
GERALD B. STEINCROSS
BY
Roepth L Chappell
ATTORNEY Patented June 28, 1949

2,474,287

UNITED STATES PATENT OFFICE 2,474,287

VOLTAGE REGULATOR

Gerald B. Steincross, Long Beach, Calif.

Application September 4, 1945, Serial No. 614,327

2 Claims. (Cl. 322—18)

(Granted under the act of March 3, 1883, as amended April 30, 1928; 370 O. G. 757)

This invention relates to voltage regulators and more particularly to a device for automatically constraining output voltage surges of motor generators.

Electrical devices energized by motor generators are occasionally subjected to violent voltage surges of sufficient intensity to cause material damage when the generator is loaded. This has been particularly true where alternators having a compensating field connected in series with the armature of a driving motor have been employed and the recommended operating power factor of the alternator is exceeded. With the application of a load to such an alternator, a surge of current occurs in the compensating field which results in an abnormally high voltage output.

It has been found that the voltage surge can be reduced to a safe value by providing a resistance in parallel with the compensating field as a shunt circuit. While such a resistance makes the output of the alternator safe, it restricts the output voltage and renders the alternator inefficient during constant load operations.

The principal object of my invention is, therefore, to provide improved means for overcoming voltage surge in the output of a motor driven alternator.

Further objects of my invention are to provide a means for regulating the voltage output of alternators so as not to interfere with the electrical output thereof under conditions of constant load; to provide a device for shunting the compensating field of the alternator while a load is being suddenly applied; to provide a device for interrupting the shunt circuit when the danger of voltage surge has passed; to provide improved elements and arrangements thereof in a compact electrical device of the character described; and to accomplish the noted objects in a facile, economical, and efficient manner.

In accomplishing these and other objects of the present invention, I have provided improved details in the structure of the electrical device the preferred form of which is illustrated in the accompanying drawing, wherein the figure is a diagrammatic illustration of the electrical device embodying my invention.

Referring more in detail to the drawing:

It will be noted, generally, that a motor 1 and an alternator 2 mechanically driven by the motor are shown. Certain conventional elements, presently more fully described, are shown within the motor 1 and the alternator 2 to assist in describing the operation of the present invention.

Electrical energy is supplied to the motor 1 and the generator 2 through a motor field lead terminal 3, a motor line lead terminal 4, and an alternator armature terminal 5; the motor field lead terminal and alternator armature terminal being of the same polarity.

6 designates a speed regulator for the motor and may comprise a potentiometer as shown or a variable resistance. Connected in parallel to the regulator to provide in cooperation therewith a wider range of speed regulation than achieved by the speed regulator acting alone is a by-pass switch 7.

Connected in series with the parallel circuit consisting of the regulator 6 and variable resistance 7, is a motor shunt field 8 completing an electrical circuit between terminals 3 and 4.

A motor commutating field 9 in series with a motor armature 10 is indicated within the motor 1 also communicating with the terminal 4.

Within the alternator 2, 11 designates a potentiometer used to control the voltage output of the alternator, 12 the shunt field of the alternator, connected in series with the potentiometer 11, and 13 the alternator compounding field, connected in series with the motor armature 10.

Alternator slip rings 14 and output terminals 15 and 16 are shown as provided in conventional alternators.

The field coils of the alternator are energized by connecting the potentiometer 11 of the alternator to the terminal 4 and the alternator compounding field 13 to the motor armature 10.

In the use of the motor 1 and the alternator 2 the placing of a sudden load on the alternator imposes an increased mechanical load on the motor. The increased mechanical load on the motor 1 results in an increased flow of electrical current through the armature 10 and through the compounding field 13 of the alternator resulting in an increased voltage across the terminals 15 and 16. The load placed on the alternator 1 may increase the power factor thereof beyond the recommended operating value. In such instances, the resulting voltage surge is frequently of sufficient violence to injure the electrical equipment being energized thereby.

The following means are provided to accomplish the noted objects:

To prevent a surge of current from passing through the compounding field 13 of the alternator, a compounding field shunt circuit 17 is provided. The shunt circuit 17 is connected to the electrical circuit of the alternator 2 in parallel with the compounding field 13 as at 18 and 19.

The shunt circuit 17 comprises a compounding field shunt resistor 20 and a shunt circuit relay 21 connected in series. The shunt resistor 20 is properly matched with the alternator compounding field 13 to provide a by-pass path of the desired resistance. The shunt circuit relay 21 is closed only when it is desired to utilize the shunt circuit 17 and is commonly known as a "make circuit" relay.

The electrical equipment being energized by the alternator 2 requires protection against excessive voltage surges only when the output voltage of the alternator is sufficiently high that a summation of the output voltage and a voltage surge is of dangerous magnitude.

With this in mind a shunt relay operating circuit 22 is provided to open and to close the shunt relay 21. The actuating element such as an operating circuit 22 consists of a relay operating coil 23 and a time delay relay 24, hereinafter described, connected in series between the alternator terminals 15 and 16. The actuating element operating coil 23 is of such rating as to close the shunt relay 21 only when a voltage approaching or surpassing the normal operating voltage of the alternator 2 is impressed on the operating circuit 22. The time delay relay is opened only to interrupt the shunt relay operating circuit 22 and is commonly known as a "break circuit" time delay relay.

The danger of excessive voltage output from the alternator 2 exists for only a brief period after the sudden loading of the alternator.

Further, if the shunt circuit 17 is maintained during constant load operating conditions, current needed to excite the compounding field is permitted to by-pass it and the voltage output of the alternator is reduced. It thus is obvious that it is advantageous to interrupt the shunt circuit 17 after the brief danger period has passed.

To this end, a time delay relay operating circuit 25 is furnished for operating the relay 24. The time delay relay operating circuit 25 comprises an actuating element such as an operating coil 26 in the time delay relay 24 connected in series with a current relay 27 across the output terminals 15 and 16 of the alternator 2 as at 28 and 29. The time delay relay 26 is of a type that opens a brief period after having its actuating element 26 energized. The current relay 27, commonly referred to as a "make circuit" type, is normally open; closing only when it is desired to complete the time relay circuit 25.

The current relay 27 is preferably adjustable to permit the relay to be set to open and to close at the amperages desired. In order to obtain accurate adjustment with an economical relay a current relay operating on low amperages is used.

Referring again to the motor 1 and the alternator 2, when an operating load is put across the terminals 15 and 16 the alternator puts a greater mechanical load on the motor 1. The increased demand for power on the shaft of the motor causes a greater flow of electrical current between the motor armature 10 and the compounding field 13 of the alternator. This fact is utilized in controlling the current relay 27.

The current relay 27 has an actuating element such as an operating coil 30 that is connected by a current relay operating circuit 31 in series with the armature 10 and the compounding field 13 to open and to close the current relay 27 in response to current fluctuations.

To permit the use of an economical, low amperage current relay at 27, to provide a greater range of adjustment of the relay, and to keep its operating current within safe bounds when either a 115 or 230 volt power supply is employed to energize the motor 1 and the alternator 2, a shunt resistance circuit 32 is arranged to by-pass the current relay 27. The shunt circuit 32 includes a pair of resistors 33 and 34 and a selector switch 35. The selector switch 35 is used to by-pass the operating coil 30 by providing a shunt circuit through either the resistor 33 or 34 or through both of them arranged in parallel.

As an additional protective measure, an electric fuse element 36 is provided in series with the operating coil 30.

*Operation*

The operation of the voltage regulator constructed as described is as follows:

The current relay 27 is adjusted to be opened and closed as desired in response to the current flowing through the coil 30. For example, it may be found practical to set the relay 27 to close at approximately 3.5 amperes and to open at approximately 2.5 amperes. The selector switch 35 is then adjusted until the current relay 27 carries current in excess of 3.5 amps. during voltage surge conditions but carries current of less than 2.5 amps. during normal operation.

When the motor 1 and the alternator 2 are at rest the compounding field shunt relay 21 and the current relay 27 are open, interrupting the circuits 17 and 25, and the time delay relay 24 is in a closed position, completing the compounding field relay operating circuit 22. The current operating circuit 31 has no interrupting means and is therefore always in a closed condition.

When the source of power is connected to the motor 1 and the alternator 2 at terminals 3, 4, and 5, the motor and alternator gradually accelerate from a standstill position to a normal running speed. The fields of the alternator 2 being excited, an increasing voltage is built up across the terminals 15 and 16 in response to alternator acceleration. The shunt relay operating circuit 22 being connected between the terminals 15 and 16 has impressed upon it a gradually increasing voltage in response to the acceleration and the alternator.

Just before the normal output voltage of the alternator 2 is reached, sufficient voltage is impressed on the shunt relay operating circuit 22 to close the shunt relay 21 and complete the shunt circuit 17.

So completed, the shunt circuit 17 provides a by-pass path parallel to the compounding field 13 of the alternator. As long as the alternator 2 continues to develop a sufficient output voltage and as long as the time delay relay 24 remains closed, the shunt relay operating circuit 22 maintains the relay 21 in closed position. Thus at all times when the motor 1 and alternator 2 are rotating at a normal speed and there is no load imposed on the alternator, the compounding field shunt circuit 17 is ready to by-pass the compounding field 13 with any excessive current caused by the sudden imposition of a load. The shunt circuit 17 continues to by-pass the compounding field 13 so long as the current in the compounding field circuit continues to remain below the predetermined magnitude at which the current relay 27 will be actuated. This feature makes this apparatus useful, for example, in supplying certain types of electronic equipment which, on "standby" condition, draw a low load consisting only of sufficient current to keep the electronic tube filaments heated and ready for instant operation, and which, on "operate" condition draw perhaps the full rated load of the generator. When used with such electronic equipment, this apparatus keeps the compounding field shunted during "standby" condition and is prepared to protect the electronic equipment from transient surge voltages occasioned by the current surge resulting from the switchover from "standby" (low load) to "operate" (full load).

Upon the sudden placing of a load on the alternator 2, such as by switching over attached electronic equipment from "standby" to "operate" whereby the electrical drain on the alternator is increased from low load to full load, a greater mechanical load is put on the shaft of the motor 1. The increased shaft load on the motor 1 slows the motor and causes a surge of current to flow through the motor armature 10 and the alternator compounding field 13 by way of the current relay operating circuit 31 and the shunt resistance 32. This current finally stabilizes at an increased substantially constant magnitude, for example, the full load value for the attached electronic equipment, which causes a constant flow of current in the circuit 31 that exceeds the predetermined value required for energization of the current relay 27. The current relay 27, being previously set to operate upon such an increased magnitude of current, closes and completes the time delay relay operating circuit 25.

The compounding field 13 escapes the surge of current by said current surge being shunted through the compounding field shunt circuit 17, this circuit having already been closed as the normal output voltage of the alternator was approached.

With the closing of the current relay 27, the time delay relay operating circuit 25 and the time delay relay actuating element 26 therein are energized. The time delay relay 24 is adjusted to delay a brief period after the energizing of the actuating element 26 before opening, thus insuring that the compounding field 13 is shunted during the transient period, such as when the attached electronic equipment is switched over from low load to full load, in order to make certain that the generated voltage of the alternator is kept within proper limits which might otherwise be exceeded by virtue of the increased field flux in the alternator caused by a transient current surge in the compounding field coils.

After a sufficient period of time has passed for the surge of current to by-pass the compounding field 13, the time delay relay 24 opens, breaking the shunt relay operating circuit 22, which in turn opens the shunt relay 21 and interrupts the compounding field shunt circuit 17. At this point the danger from current surge has passed, the shunt circuit 17 is no longer required as a current surge by-pass, and it is thus interrupted so that it in no way interferes with the loaded operation of the alternator.

In a similar manner when the load is taken off of the alternator at 15 and 16, the current flowing through the current relay operating circuit and shunt resistance 32 suddenly drops. The current relay 27 is opened by the drop in the current passing through its operating coil 30. When the current relay 27 opens, the time delay relay operating circuit 25 closes, the time delay relay 24 closes, the shunt relay operating circuit 22 closes, the shunt relay 21 in turn closes and the compounding field shunt circuit 17 again is ready to protect the compounding field 13 from any current surge that may again occur. The shunt circuit remains in such protective arrangement until either the alternator is again loaded or the motor and generator are turned off.

When the motor 1 and the generator are turned off the current flowing through the shunt relay operating circuit 17 drops to a point below which it can maintain the shunt relay 21 in a closed position and the shunt relay opens, interrupting the compounding field shunt circuit. Thus, again while there is no danger from a sudden current surge between the armature 10 and the alternator compounding field 13, the compounding field shunt circuit is disengaged and will provide no dissipation of energy by by-passing the compounding field until the voltage again approaches normal operation and protective shunting is again required.

While I have shown but one embodiment of my invention, it is susceptible to modification without departing from the spirit of the invention. I do not wish, therefore, to be limited by the disclosures set forth, but only by the scope of the appended claims.

The invention described herein may be manufactured and used by or for the Government of the United States of America for governmental purposes without the payment of any royalties thereon or therefor.

I claim:

1. In an apparatus of the character described including a motor generator set, the motor of which is provided with a series field and the generator of which is provided with a compounding field; a shunt circuit across said compounding field including a shunt resistor and a shunt relay connected in series, the shunt relay being set to maintain said shunt circuit closed in response to approximately normal voltage of said generator; an operating circuit for said shunt relay including a time delay relay connected in series with the actuating element of said shunt relay between the output terminals of said generator, the time delay relay being adjusted to open the shunt relay operating circuit after the lapse of a predetermined time period after the energization of said time delay relay; an operating circuit for said time delay relay comprising a current relay connected in series with the actuating element of the time delay relay across the output terminals of said generator, said current relay being adjusted to close said time delay relay operating circuit when the current flowing through the actuating element of said current relay exceeds a predetermined magnitude; and an operating circuit for said current relay connecting the actuating element thereof in series with the armature and series field of said motor and the compounding field of said generator; whereby said shunt circuit is opened a predetermined time after the load on said generator exceeds a predetermined magnitude.

2. In an apparatus of the character described including a motor generator set, the motor of which is provided with a series field and the generator of which is provided with a compounding field, said series field and said compounding field being connected in series; a shunt circuit across said compounding field to limit the voltage output of said generator upon sudden increase of load, as during the change from low load to full road condition; and means comprising a time delay relay arrangement controlled by the current in the circuit of said compounding field for opening said shunt circuit a predetermined time after the current in said compounding field circuit has exceeded a predetermined magnitude; whereby full compounding field current flows through the compounding field after said generator has reached its steady state full load condition.

GERALD B. STEINCROSS.

REFERENCES CITED

The following references are of record in the file of this patent:

UNITED STATES PATENTS

| Number | Name | Date |
|---|---|---|
| 1,116,430 | Jackson | Nov. 10, 1914 |
| 2,009,103 | Byles | July 23, 1935 |